United States Patent [19]
Katchka

[11] 3,796,368
[45] Mar. 12, 1974

[54] DIAPHRAGM OPERATED FLOW CONTROL DEVICE

[75] Inventor: Jay R. Katchka, Cypress, Calif.

[73] Assignee: Robertshaw Controls Company, Richmond, Va.

[22] Filed: Sept. 18, 1972

[21] Appl. No.: 289,907

[52] U.S. Cl............... 236/80, 236/92 A, 137/489.5
[51] Int. Cl.......................... F23n 1/00, F16k 31/14
[58] Field of Search ......... 236/80, 92 A; 137/489.5, 137/82

[56] References Cited
UNITED STATES PATENTS

| | | | |
|---|---|---|---|
| 3,688,981 | 9/1972 | Sidaris | 236/80 |
| 3,017,897 | 1/1962 | Seguenot | 137/529 |
| 3,300,174 | 1/1967 | Urban et al. | 236/92 A |
| 3,087,705 | 4/1963 | Hamilton | 137/505.18 X |
| 3,550,623 | 12/1970 | Katchka | 137/613 |

*Primary Examiner*—William E. Wayner
*Attorney, Agent, or Firm*—Anthony A. O'Brien

[57] ABSTRACT

A gas flow control device for main and pilot burner apparatus includes a diaphragm operated valve for pressure regulation of the main gas flow, a pilot pressure regulator for pressure regulation of the pilot gas flow, and an automatically actuated valve controlling the main gas flow in accordance with predetermined temperature conditions. The diaphgram operated valve is pressure loaded by the regulated pressure of the pilot gas flow, which loading pressure is appropriately reduced so that the main and pilot gas flows are delivered at two separate pressure levels.

2 Claims, 2 Drawing Figures

3,796,368

DIAPHRAGM OPERATED FLOW CONTROL DEVICE

BACKGROUND OF THE INVENTION

1. Field of the Invention

The present invention relates to a gas flow control device for main and pilot burner apparatus and, in particular, to such a device having a differential pressure diaphragm for pressure regulation of the main gas flow, a thermostatic control for the main gas flow, a pressure regulator for the pilot gas flow and for pressure loading of the differential pressure diaphragm.

2. Description of the Prior Art

It is conventional practice for gas control devices to thermostatically control a main flow and to regulate the pressure of both the main flow and pilot flow. Examples of control devices of this nature are found in U.S. Pat. No. 3,402,889, No. 3,453,062, No. 3,528,452, No. 3,550,623 and No. 3,654,948.

Prior art U.S. Pat. No. 3,402,889, No. 3,453,062 and No. 3,528,452 illustrate conventional arrangements wherein a pilot regulator delivers a pressure regulated pilot flow to a pilot outlet and to a pilot flow line influencing a main diaphragm operated valve that delivers a pressure regulated main flow, and wherein thermostatic control is accomplished by on-off controls in the pressure regulated pilot flow line. U.S. Pat. No. 3,550,623 and No. 3,654,948 disclose gas flow control devices in which thermostatic on-off control of a main gas flow is performed downstream of a main diaphragm operated valve that pressure regulates such main flow, and in which such main diaphragm is pressure loaded by a pilot line regulator.

While the prior art devices are satisfactory for their particular purposes, they are encumbered with the disadvantages of complexity of pilot line control, multiple components resulting in relatively large manufacturing costs, and complicated adjustment and/or calibration constructions. In addition, certain prior art devices use independent pressure regulators which are independently set to deliver main gas flow and pilot gas flow at different pressure levels, while other prior art devices that pressure load a main diaphragm valve from the pressure regulated pilot line have no provision for obtaining the different pressure levels necessary for optimum performance of main and pilot gas burner apparatus.

SUMMARY OF THE INVENTION

The present invention is summarized in that a diaphragm operated flow control device includes a casing having an inlet and a main outlet with a main passage therebetween, a pilot outlet in the casing, a pilot passage establishing communication between the inlet and the pilot outlet, a pilot regulator in the pilot passage whereby a pilot flow therethrough is delivered at a predetermined pilot regulated pressure, main control means including a main regulating valve in the main passage and a diaphragm for moving the same whereby a main flow through the main passage is delivered at a predetermined main regulated pressure, a pressure loading chamber for the diaphragm, means establishing communication between the pilot regulator and the chamber whereby the same is subject to the pilot regulated pressure, the diaphragm having one side responsive to pressure in the chamber and on opposing side responsive to the main regulated pressure, and means controlling the pressure in the chamber whereby the main regulated pressure and the pilot regulated pressure are maintained at different pressure levels.

It is an object of the present invention to regulate the pressures of main and pilot flows in a flow control device at different levels.

This invention has another object in that the main flow delivered by a flow control device is maintained at a lower pressure level than that of the pilot flow delivered by such control device.

The present invention has another object in that a pressure loaded main diaphragm valve is operated in accordance with control of a pressure regulated pilot flow which provides the pressure loading of the main diaphragm valve.

In accordance with another object of this invention, a pressure pilot flow which is utilized to operate the main diaphragm in an arrangement having thermostatic control of a main flow, is delivered at a predetermined pressure level by flow restricting means in the pilot line.

It is a further object of the present invention to balance a main diaphragm valve in a flow control device having thermostatic control of the main flow, pressure regulation of the main flow, pressure regulation of a pilot flow, and adjustable control of the regulated pilot flow to load the main diaphragm to an adjusted pressure.

Other objects and advantages of the present invention will become apparent from the following description as read in conjunction with the accompanying drawing.

DESCRIPTION OF THE PREFERRED EMBODIMENTS

Figure 1:
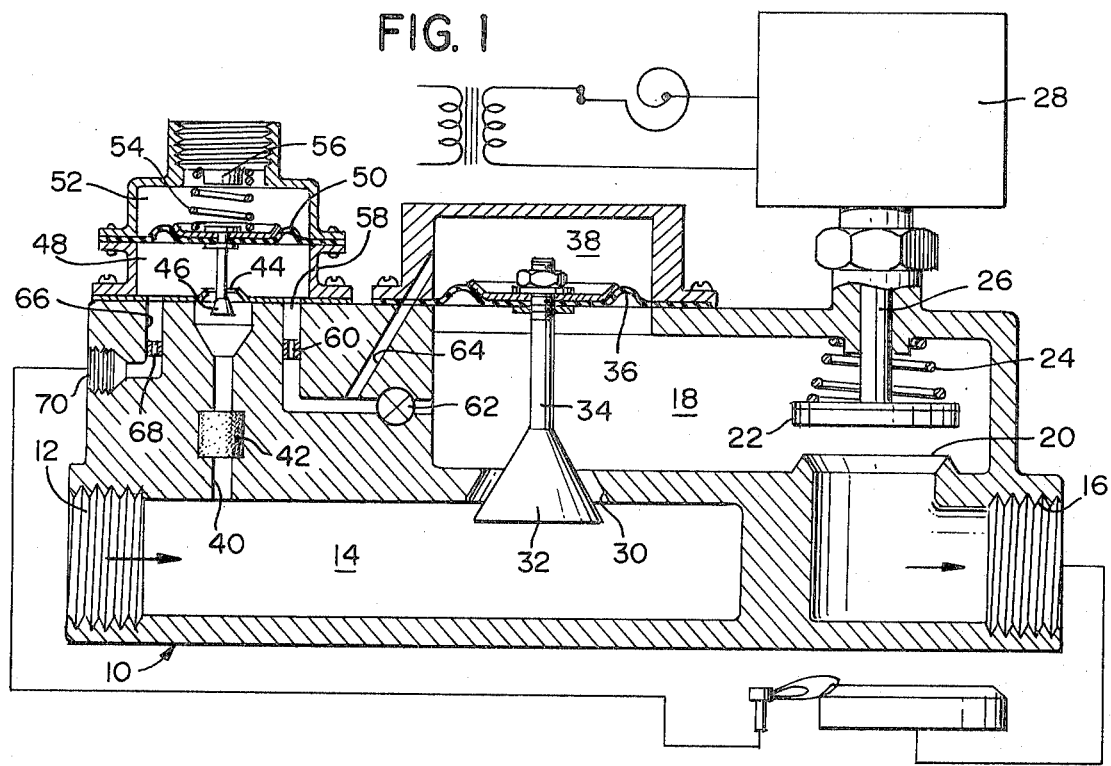
FIG. 1 ia a schematic diagram with parts in section of a gas flow control device embodying the present invention in conjunction with burner apparatus.

As is illustrated in FIG. 1, the present invention is utilized in conjunction with gas burner apparatus including a pilot burner located in igniting proximity to a main burner which is disposed in any suitable appliance such as furnaces, dryers, etc. Gas is supplied to the burners under the control of a gas flow control device, indicated generally at 10, having an inlet port 12 adapted for connection to a gas source (not shown) and leading to an inlet chamber 14, and an outlet port 16 adapted for connection to the main burner and leading from an outlet chamber 18.

An outlet valve seat 20 separates the outlet port 16 from the outlet chamber 18 and a valve element 22 is biased toward the outlet valve seat 20 by a coil spring 24 mounted in compression between the valve element 22 and an internal casing wall of the control device 10. The valve element 22 is carried on one end of a valve stem 26, the other end of which is operated by a thermostatic actuator 28. The thermostatic actuator 28 is not shown in detail inasmuch as a variety of electrical, mechanical or hydraulic actuators may be used; e.g., an electromagnetic actuator electrically connected in an energizing circuit including a bimetal thermostat and a transformer.

The inlet and outlet chambers 14 and 18 are separated by a regulating valve seat 30 through which gas flow is regulated by a regulating valve element 32 which is carried by a rod 34 that is attached to a diaphragm 36 by any suitable means for unitary movement therewith. The diaphragm 36 is made of any suitable flexible material, such as rubber, and defines a movable wall between the outlet chamber 18 and a pressure loading chamber 38.

A pilot flow passage 40 with a filter 42 intermediate its ends has one end communicating with the inlet chamber 14; downstream of the filter 42, the passage 40 leads to a pilot flow pressure regulator, the inlet to which is defined by a valve seat 44. A pilot regulating valve element 46 cooperates with the valve seat 44 to regulate the pressure of the pilot flow to a pilot regulator outlet chamber 48. A rubber flexible diaphragm 50 is connected to the valve element 46 for unitary movement therewith and defines a movable wall between the regulator outlet chamber 48 and an atmospheric chamber 52. A coil spring 54 in the atmospheric chamber 52 is mounted in compression between the diaphragm 50 and an adjustable screw 56 whereby the regulator valve 46 is normally biased toward an open position.

A regulated pilot flow passage 58 extends from the regulator outlet chamber 48 to the main flow outlet chamber 18; a fixed flow restrictor 60 is disposed in passageway 58 adjacent the regulator outlet chamber 48 and an adjustable flow restrictor 62 is disposed in passageway 58 adjacent the main flow outlet chamber 18. A branch passageway 64 extends from the pressure loading chamber 38 and the passageway 58 at a point between the flow restrictors 60 and 62.

A regulated pilot flow passage 66 having a fixed flow restrictor 68 therein also communicates with the regulator outlet chamber 48. The passageway 66 leads to a pilot flow outlet port 70 which is adapted for connection to the pilot burner.

The gas flow control device of FIG. 1 may include a manual on-off valve (not shown) and/or an automatic safety valve (not shown) responsive to pilot burner operation, both of which are located upstream of inlet port 12 as is well known in the art. A pilot gas flow proceeds from the inlet chamber 14 through the pilot flow passage 40 and filter 42, past the pressure regulating valve element 46 and seat 44 into the pilot regulator outlet chamber 48; thence the pressure-regulated pilot gas flow continues through the passage 66, flow restrictor 68, pilot flow outlet port 70 and the conduit leading to the pilot burner which consequently maintains a flame for igniting the main burner.

In operation of the flow control device illustrated in FIG. 1, the bimetal thermostat will be assumed to be in a heat demand condition wherein its contacts are closed to complete the energizing circuit for the thermostatic actuator 28 causing the valve element 22 to be opened relative to its valve seat 20. A main gas flow proceeds from the inlet chamber 14 past the normal opened valve element 32 and its seat 30 into the outlet chamber 18, thence past the opened valve element 22 and its valve seat 20 to the outlet port 16 and the conduit leading to the main burner which is ignited by the pilot burner flame. As soon as the demand for heat is satisfied, the bimetal thermostat opens its contacts to deenergize the thermostatic actuator 28 causing the valve element 22 to be closed on its valve seat 20 by the coil spring 24 whereby the main gas flow to the main burner is cut off. Thereafter, the main burner will be cycled thermostatically in accordance with temperature variations from a predetermined set point as sensed by the bimetal thermostat.

The main gas flow past the valve seat 30 is pressure regulated by the valve element 32 which is imparted with a regulatory movement by the diaphragm 36. This main regulating valve element 32 is in a normally open position and its diaphragm 36 is moved in response to the pressure differential between the pressure in outlet chamber 18 and the pressure in the pressure loading chamber 38. A regulated pilot gas flow from the pilot regulator outlet chamber 48 proceeds through the passageway 58 and past the fixed flow restrictor 60 whence it branches into two paths; one of such paths includes the branch passageway 64 leading to the chamber 38 whereby the diaphragm 36 is pressure loaded by the regulated pilot gas flow, and the other of such paths includes the adjustable flow restrictor 62 which leads to the main outlet chamber 18. Since the adjustable flow restrictor 62 is downstream of the branch passageway 64, the pressure loading chamber 38 is always assured of being loaded by the regulated pilot gas flow; thus, the adjustable flow restrictor 62 defines a bleed line for the loading chamber 38.

Whenever the thermostatically operated valve element 22 is closed, the pilot regulator valve 46 is regulating only the pilot gas flow to the pilot burner. In this particular installation, the inlet pressure in the inlet chamber is supplied at 7 inches W.C. (water column) from the gas source. Under such conditions the regulated pilot gas flow is delivered to the pilot burner at a pressure of approximately 5 inches W.C.

Upon opening of the thermostatically operated valve element 22, the pilot regulator controls the main gas outlet pressure. If the adjustable restrictor 62 were to be completely closed, the loading pressure in the loading chamber 38 is substantially the same as the pressure regulated pilot gas flow, i.e., 5 inches W.C. and the main gas outlet pressure delivered to the main burner is only slightly less than 5 inches W.C. of the pressure regulated pilot gas flow; the difference being 0.1 inch or 0.2 inch W.C. less for the main burner pressure due to the pressure drop through the thermostatically operated valve element 22 and seat 20.

When the adjustable restrictor 62 is opened to a selected adjusted position, the loading pressure in the loading chamber 38 is lowered because the fixed restrictor 60 causes a pressure drop whereby the loading pressure on the top of the main diaphragm 36 is reduced. Consequently, the regulated main burner gas pressure is less than the regulated pilot burner gas pressure; in this particular installation, the regulated main burner gas pressure is approximately 3 inches W.C.

It is commonly known that a pilot burner using natural gas has burning characteristics wherein better performance, efficiency and stability are obtainable at pressure of from 5 inches W.C. to 7 inches W.C., while for optimum characteristics at the main burner, pressures of from 3 inches W.C. to 5 inches W.C. are desirable. The arrangement of the present invention has the advantage that gas supplied at single inlet pressure, 7 inches W.C., is delivered to a main burner and a pilot burner at different pressure levels without the need of independent regulators for the main flow and the pilot flow, which regulators must be set at their respective levels independently.

The amount of reduction of the main burner regulated gas pressure relative to the regulated gas pressure at the pilot burner is dependent only on the relative sizes of the fixed restrictor 60 and the adjustable restrictor 62 and increasing the size of the fixed restrictor 60 will decrease the difference between the pilot burner regulated pressure and the main burner regulated pressure. Either increasing the size of the adjustable restrictor 62 or reducing the size of the fixed restrictor 60 will increase the difference between the pilot burner regulated pressure and the main burner regulated pressure.

While restrictor 60 is shown as a fixed restrictor and restrictor 62 is shown as being adjustable, they both may be fixed by predetermination of their sizes for a particular installation; in addition, the fixed and adjustable designations may be reversed or both restrictors may be adjustable.

By means of the adjusting screw 56, the pilot flow regulated pressure may be readjusted without changing the restrictors 60 and 62, and the resulting main and pilot flow regulated pressures will rise (or lower according to such readjustment) together while maintaining approximately the same difference in their levels. If desired, a readjustment of the main burner regulated pressure may be accomplished by resetting the adjustable restrictor 62 or by resizing the fixed restrictor 60.

Figure 2:
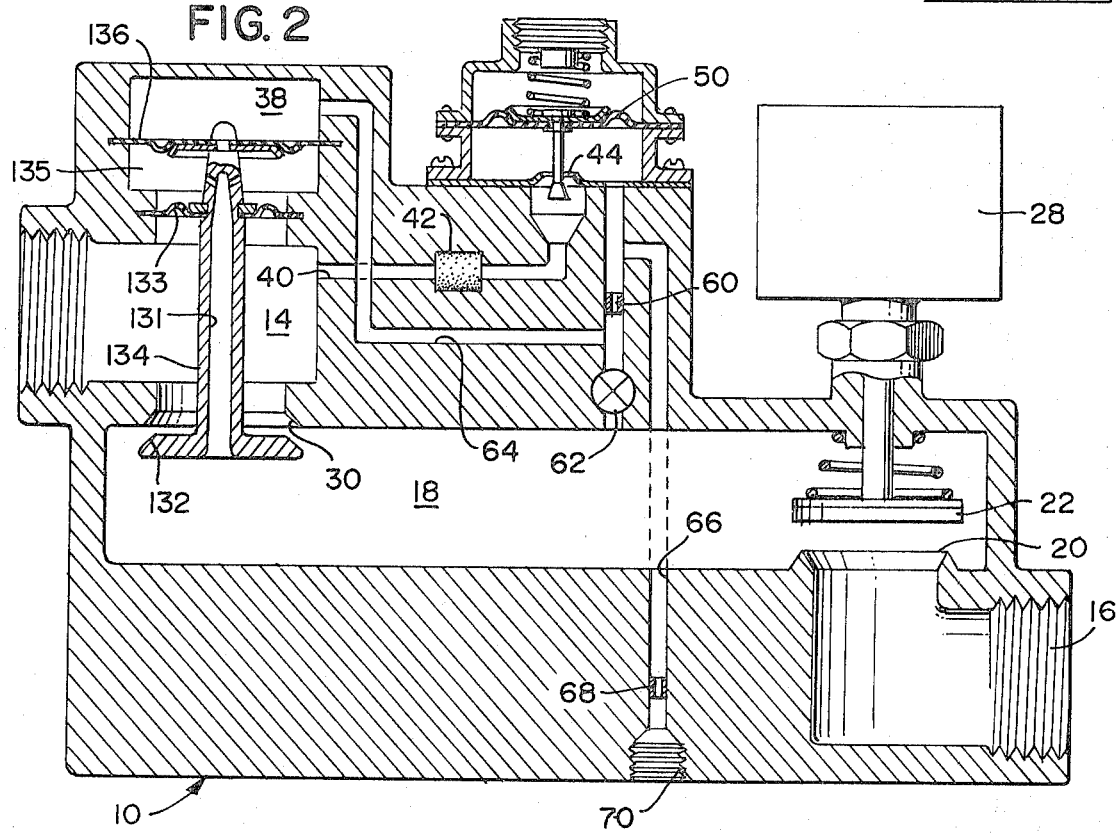
FIG. 2 is a schematic diagram similar to FIG. 1 but showing modification thereof.

In the modification illustrated in FIG. 2, the control device 10 includes all the components numbered 12 through 30 and 38 through 70 which are not being described again for the sake of brevity. Components numbered 34 and 36 are eliminated in FIG. 2 and new elements numbered in the 100 series are described below. For instance, a regulating valve element 132 is disposed in the main outlet chamber 18 for cooperation with the regulating valve seat 30. The regulating valve element 132 is fixed to one end of the valve stem which has a longitudinal bore 131 therein. A flexible rubber diaphragm 133 has its outer periphery mounted in a casing wall and its inner periphery secured to an intermediate portion of the valve stem 134 as by a retaining ring. The diaphragm 133 defines a movable wall between the inlet chamber 14 and an outlet pressure cavity 135 which communicates with the main outlet chamber 18 by means of the longitudinal bore 131. A flexible rubber diaphragm 136, larger than the diaphragm 133, is peripherally mounted in a casing wall and centrally fastened to the end portion of the regulating valve stem 134; the larger diaphragm 136 defines a movable wall between the outlet pressure cavity 135 and the pressure loading chamber 38.

The modification of FIG. 2 functions and operates similar to the functioning and operation described above in connection with FIG. 1; accordingly, the following description of the sequence of operation of FIG. 2 is limited to those features which differ from FIG. 1. A main gas flow from the inlet chamber 14 of FIG. 2 proceeds past the valve seat 30 and the regulating valve element 132 into the outlet chamber 18; the pressure regulated main flow then continues from the outlet chamber 18 through the opened valve seat 20 and outlet 16 to the main burner. The pressure regulated main flow from the outlet chamber 18 also proceeds through the valve stem bore 131 into the outlet pressure cavity 135. Accordingly, the underside of the main regulating diaphragm 136 is subject to the main regulated pressure of the outlet chamber 18 while its upperside is subject to the pilot regulated pressure in the pressure loading chamber 38.

The upper diaphragm 136 constitutes the pressure regulating diaphragm for the main gas flow. The lower diaphragm 133, which has a smaller surface area than that of diaphragm 136, constitutes a balancing diaphragm that separates the inlet chamber 14 from the outlet pressure cavity 135. With such an arrangement, the inlet pressure of the gas flow on the regulating valve element 132 is balanced by the balancing diaphragm 133. The remaining components of FIG. 2 operate as described above in connection with FIG. 1 is providing adjustable control of the pilot regulated pressure for pressure loading of the main diaphragm.

Inasmuch as the present invention is subject to many variations, changes in details and reversal of components, it is intended that all matter contained in the foregoing description or shown on the accompanying drawing shall be interpreted as illustrative and not in a limiting sense.

What is claimed is:

1. In a diaphragm operated flow control device, the combination comprising a casing having an inlet, a main outlet, a main passage including an outlet chamber establishing communication between said inlet and said main outlet, a pilot outlet, and a pilot passage establishing communication between said inlet and said pilot outlet;

pilot pressure regulator means disposed in said pilot passage for supplying a pilot flow therethrough at a predetermined pilot regulated pressure;

main control means including main pressure regulating valve means disposed in said main passage and diaphragm means for moving said main pressure regulating valve means for supplying a main flow through said main passage at a predetermined main regulating pressure less than said pilot regulated pressure;

means defining a pressure loading chamber for said diaphragm means;

passage means establishing communication between said pilot regulator means and said pressure loading chamber and said outlet chamber;

said diaphragm means having one side responsive to pressure in said pressure loading chamber and an opposing side responsive to said main regulated pressure in said outlet chamber; and adjustable flow restricting means disposed in said passage means for reducing the pressure in said pressure loading chamber lower than said pilot regulated pressure said passage means includes a first passageway extending from the pilot regulator means to said outlet chamber, and a second passageway extending from said first passageway to said pressure loading chamber and said flow restricting means includes a fixed flow restrictor located upstream of said second passageway and an adjustable flow restrictor located downstream of said second passageway.

2. The invention as recited in claim 1 wherein said diaphragm means includes a regulating diaphragm and a balancing diaphragm spaced from each other to define a pressure cavity therebetween in communication with the main regulated pressure of the main flow through said main passage, said balancing diaphragm having one side responsive to pressure in said pressure cavity and an opposite side responsive to pressure in said inlet means whereby movement of said main regulating valve means is balanced with respect to pressure in said inlet means, and wherein said main control means further includes automatically operated valving means disposed in said main passage downstream of said main regulating valve means and thermostatic actuator means for automatically operating said valving means in accordance with predetermined temperature conditions.

* * * * *